United States Patent [19]
Bales et al.

[11] Patent Number: 5,867,885
[45] Date of Patent: Feb. 9, 1999

[54] IBR FIXTURE AND METHOD OF MACHINING

[75] Inventors: Daniel A. Bales, Palm City; Leroy F. Turner, Sr., West Palm Beach, both of Fla.

[73] Assignee: United Technologies Corporation, Hartford, Conn.

[21] Appl. No.: 115,709

[22] Filed: Jul. 15, 1998

Related U.S. Application Data

[62] Division of Ser. No. 768,370, Dec. 17, 1996, Pat. No. 5,822,841.

[51] Int. Cl.$^6$ .................................................. B23Q 7/00
[52] U.S. Cl. .............................. 29/559; 29/281.1; 29/889
[58] Field of Search ........................ 29/559, 889, 401.1, 29/889.1, 527.6, 598, 596; 269/909, 43, 287, 53, 54.3, 54.5

[56] References Cited

U.S. PATENT DOCUMENTS

| | | |
|---|---|---|
| 2,916,256 | 12/1959 | Welch . |
| 4,479,296 | 10/1984 | Miller et al. . |
| 5,031,288 | 7/1991 | Sadler . |
| 5,109,589 | 5/1992 | Cramer et al. ........................ 29/527.6 |
| 5,109,606 | 5/1992 | De Michael et al. . |
| 5,113,583 | 5/1992 | Jankel et al. . |
| 5,414,929 | 5/1995 | Floser et al. ............................. 29/889 |
| 5,544,873 | 8/1996 | Vickers et al. .......................... 269/559 |
| 5,620,308 | 4/1997 | Yoshinari et al. ....................... 29/889 |
| 5,711,195 | 1/1998 | Koelling .................................. 29/559 |

*Primary Examiner*—David A. Scherbel
*Attorney, Agent, or Firm*—Norman Friedland

[57] ABSTRACT

A fixture for use in the final machining operation of the integral bladed rotor (IBR) of a gas turbine engine comprises a rigid ring for surrounding the outer periphery of the IBR and supporting tapered pins that fit into the space between the blades and then molded therein with a plaster or plastic medium for securing the unit to the IBR for enhancing its structural integrity. The method of finishing the airfoils of the IBR includes inserting the pins in alternate spaces and working half of the blade surfaces in the pinless spaces and then removing the pins and inserting pins in the previously worked spaces and then molding the pins in place. The other half of the bladed surface is then worked in the pinless spaces until the airfoils are finally contoured. The unit is removed and heated to melt the residual cast medium to produce the finished product.

5 Claims, 3 Drawing Sheets

IBR FIXTURE AND METHOD OF MACHINING

The present invention is a divisional application of application Ser. No. 08/768,370, filed Dec. 17, 1996, which is now has a U.S. Pat. No. 5,822,841.

This invention was made under a U.S. Government contract and the Government has rights herein.

TECHNICAL FIELD

This invention relates to integral bladed rotors (IBR) and particularly to the method of machining the IBR and the fixture utilized in this machining process.

BACKGROUND ART

As one skilled in the aeronautical art appreciates the integral bladed rotor formed from superalloy materials which sometimes is referred to as a blisk or IBR is a relatively new concept for fabricating axial flow turbine and/or compressor rotors utilized in the gas turbine engines. Heretofore, the blades and disk of the rotors were individually formed and the blades were typically attached to the rim of the disk with a well known dovetail or fir tree root attachment assembly. The IBRs are formed by forging the blades and disk into a rough finished form and machining the airfoil of the blades in the final configuration. The blades of the IBR are either forged integrally with the disk or the blades are metallurgically bonded to the disk.

Examples of methods of fabricating and repairing IBRs are disclosed in U.S. Pat. No. 4,479,273 granted to Miller et al on Oct. 30, 1984 and entitled "Process For Fabricating Integrally Bladed Bimettallic Rotors", U.S. Pat. No. 5,113,583 granted to Jenkel et al on May 19, 1992 entitled "Integrally Bladed Rotor Fabrication" and U.S. Pat. No. 5,109,606 granted to DeMichael et al on May 5, 1992, all being assigned to the assignee common to this patent application and being incorporated herein by reference.

Whether the blades and disks are integrally formed or the blades are metallurgically attached to the disk or for that matter regardless of the method of forming the IBR into the rough or unfinished form, problems have arisen during the final machining operation. Namely, because of the metal utilized and the thinness, of the airfoil section of the blades, the structure has the propensity of flexing in the machining process. Typically, the airfoils are machined to the final configuration by a computerized milling machine. The cutting tool or tools in a multiple cutting operation exert a force on the blades being machined which has a tendency of causing the blades to deflect. This deflection is acerbated when the cutter(s) moves in a radially outward direction. Obviously, any deflection during the machining operation will adversely affect the final dimensions of the airfoil and consequently, the tolerances required are adversely affected. It is imperative that the tolerances of these engine components, particularly when used in aircraft powered by gas turbine engines, are held to a minimum.

It is well known and common practice for these machining operation to cast into the cavity or spaces between each of the blades a low temperature casting material such as a plaster or plastic to add rigidity to the blades and reduce and minimize the deflection of the airfoils during the machining process. While this practice is acceptable in certain applications it is not acceptable in the gas turbine engine applications.

This invention obviates the problems alluded to in the above paragraphs by incorporating a fixture that enhances the rigidity of the airfoils and hence, minimizes or eliminates the deflections heretofore occasioned by the finished machining operation. A ring fixture surrounding and spaced from the tips of the airfoil is fitted with a plurality of circumferentially spaced pins that are inserted into the space between blades. A suitable plaster or plastic material is cast into the space and the combination of the ring, pins and cast material adequately support the rotor during the final cutting of the airfoil configuration. In accordance with the method taught in this invention, the pins are discretely formed with a large diameter head, a threaded shank portion and a tapered shank portion. The pin is secured to the ring and the tapered shank is embedded into the cast material. Alternate spaces are outfitted with the pins in preparation of the first machining operation. The cast material is poured between all of the blades and then cured. The entire assembly including the hardened cast material and the ring/pin arrangement are then mounted on the milling machine for the cutting of the surfaces of the airfoil where no pins are located. The pins are then removed and pins are installed in between blades. The unit is then casted with a plastic or plaster medium, curd so that the solidfified medium supports the fixture to the IBR and then returned to the milling machine where the remaining airfoil surfaces are cut to the final configuration. The fixture and rotor with the finished machined airfoils are removed from the cutting machine and heated to a temperature to melt the cast material which inherently releases the pins and the fixture from the IBR.

In an actual test of machining the IBR into its final configuration by utilizing this invention, it was found that an IBR made from a titanium alloy allowed the machining operation to feed at 5.25 inches per minute (ipm) in the machining operation. The feed rate of the heretofore machining operation was 3.0 ipm. This resulted in a 75% increase in feed rate. The machining of the finished IBR required 168 hours which was a 11.2% reduction in time. Obviously, this resulted in a considerable savings in machining time. Using a shop rate at $100 an hour, the use of this invention compared to heretofore known methods resulted in a savings of $16,800.00 per IBR. Also, of importance, was the fact that the structural integrity during the machining operation remained in tact so that the end product achieved its specified tolerances.

SUMMARY OF THE INVENTION

An object of this invention is to provide a fixture to enhance the rigidity of an IBR to minimize or eliminate distortions during the final cutting of the airfoil configuration of the blades of a rotor utilized in a gas turbine engine.

A feature of this invention is to utilize a ring dimensioned to encapsulate the rotor and pins threaded into the ring and having a tapered extension portion adapted to fit into the space between blades.

Another object of this invention is the method of enhancing the structural integrity of the IBR prior to the final machining operation of the airfoil sections of the blades, by performing the following steps:

1) Providing a fixture that comprises a ring that is dimensioned to encapsulate the rotor and positioned to surround the tips of the airfoil and spaced therefrom;
2) Drilling through holes in the circumference of the ring and judiciously spaced to align with the centers of the spaces between adjacent blades;
3) Providing the fixture with pins having a head, a threaded shank and a tapered portion at the end of the shank;

4) Judiciously inserting the pins into the holes in the ring to fit the tapered portion into alternate spaces of the spaces provided between blades;

5) Casting the unit to partially fill the spaces between all the blades and capturing the tapered portion and curing the casting medium to solidfy and bond the fixture to the IBR;

6) Machining the spaces between the blades to remove the cast material and to remove the material of the adjacent airfoil surfaces to configure the airfoil into its final configuration;

6) Removing the pins from the ring;

7) Inserting pins into the through holes in the ring to fit into the previously machined spaces;

8) Casting the IBR to fill all the spaces between blades, curing to soldify the cast medium bonding the fixture to the IBR;

9) Machining the cast medium and remaining airfoil surfaces in the unpinned spaces; and 10) Removing the cast medium by heating the IBR to a temperature above the melting point of the cast material.

The foregoing and other features of the present invention will become more apparent from the following description and accompanying drawings.

DETAILED DESCRIPTION OF THE PREFERRED EMBODIMENT

As one skilled in this art appreciates, the machining of an IBR begins by machining a cylindrical configuration from either a "pancake" forging or a "near-net shape" forging, then making radial cuts (either continuous or intermittent) from the outer diameter to the near blade root to eliminate the hoop stresses in the forging. Then, subsequently, machining (usually in a multiple machining operation) material from either side of the airfoils until the IBR is to its finished configuration. This invention is concerned with the final machining operations when the loads exerted by the cutting tools on the airfoils cause the airfoil to deflect.

Figure 1:
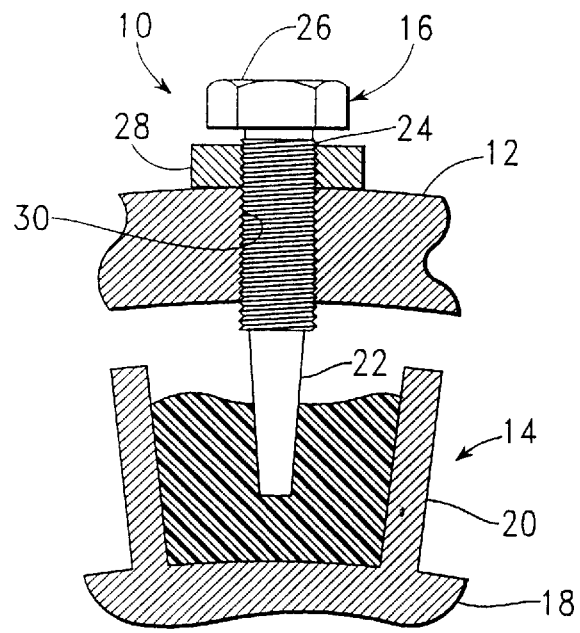
FIG. 1 is a partial view in section illustrating the fixturing device for increasing the rigidity of the IBR during the final stages of the machining operation.
Figure 2:
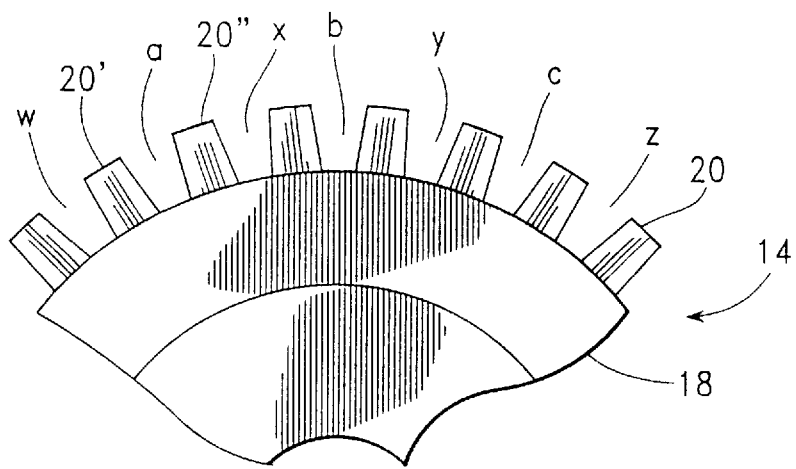
FIG. 2 is a partial view in elevation of the unfinished IBR.

According to this invention and as best seen in FIG. 1 fixture generally indicated by reference numeral 10 comprises a rigid ring 12 made from a suitable metallic material that is dimensioned to surround the IBR 14 and the pin assembly generally indicated by reference numeral 16. The IBR 14 consists of the disk 18 and the circumferentially and radially extending blades 20 and as shown in FIG. 2 are formed in the rough finish. The pin assembly consists of pin 16 having an elongated shank 15 formed into a tapered shank portion 22, a threaded portion 24, an enlarged head 26 adapted to receive a tool and a locking nut 28. Each of the pins 16 extend through a threaded bore 30 formed in ring 12 and are judiciously located so that the pins will fit into the center of the alternate spaces between adjacent blades 20.

Figure 3:
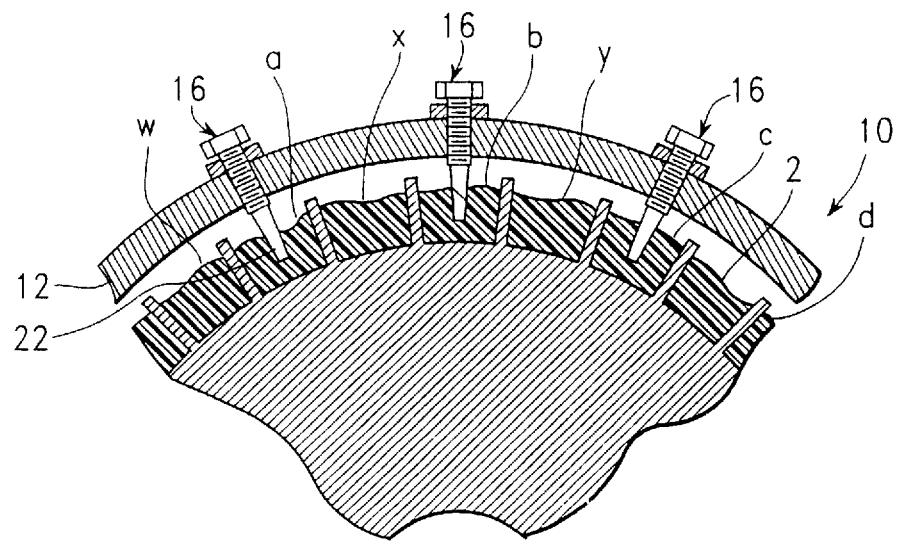
FIG. 3 is a partial view in section indicating the location of the pins encased in the casting medium disposed in the alternate spaces between blades.
Figure 4:
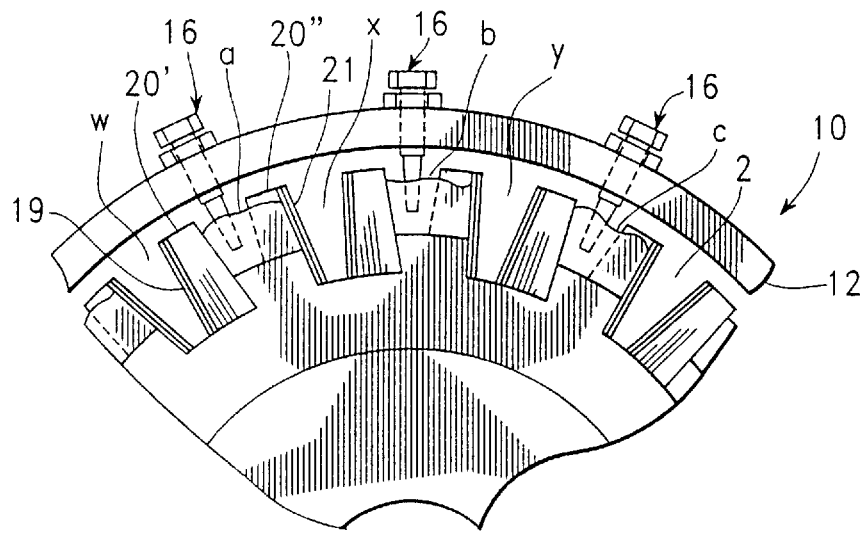
FIG. 4 is a partial view in elevation identical to FIG. 3 after the machining operation was applied to the material in the pin void locations.

The method of machining the IBR to its final configuration will be described immediately hereinbelow and next referring to FIGS. 2, 3, 4 and 5, the fixture is properly located and the pins 16 are disposed in alternate spaces a, b, c, d, et cetera as shown in FIG. 3 and the locking nuts 28 are tightened to secure the pins in place. The alternate spaces w, x, y, z et cetera are void of the pins 16. All the spaces a, b, c, d, w, x, y, z, et cetera are then cast with a plaster or plastic material. Once the cast material is hardened bonding the pin shank portions 22 to the IBR, the fixture with the "cast" IBR is then placed onto the machining centers for the cutting operation to begin the machining process. As seen if FIG. 4 the material in the casting medium in spaces w, x, y, et cetera have been removed and the surfaces of the blades from the tips to the roots. Obviously, the alternate blades have their leading edge and trailing edge respectively cut to the final configuration. For sake of simplicity and convenience only the blades 20' and 20" and the spaces w, a, x, and b will be described hereinbelow and it being understood that this description is representative of all the blades. As noted the surface of blades 20' on the leading edge 19 from the root to the tip has been cut as well as the casting medium in space w. Likewise the surface of the blade on the trailing edge 21 from the root of the blade to the tip as well as the casting medium in space x has been cut. The spaces a and b remain in tack and the pins still remain.

The next phase of the finishing operation is to remove the fixture and "cast" IBR from the cutting machine and then remove the pin assemblies, it being noted that since the pin shank portion 22 is tapered, the removal is relatively easy, at least less difficult if the pins were contoured otherwise. It is noted that the cast material remains in place except for the void left by the removed pins.

Figure 5:
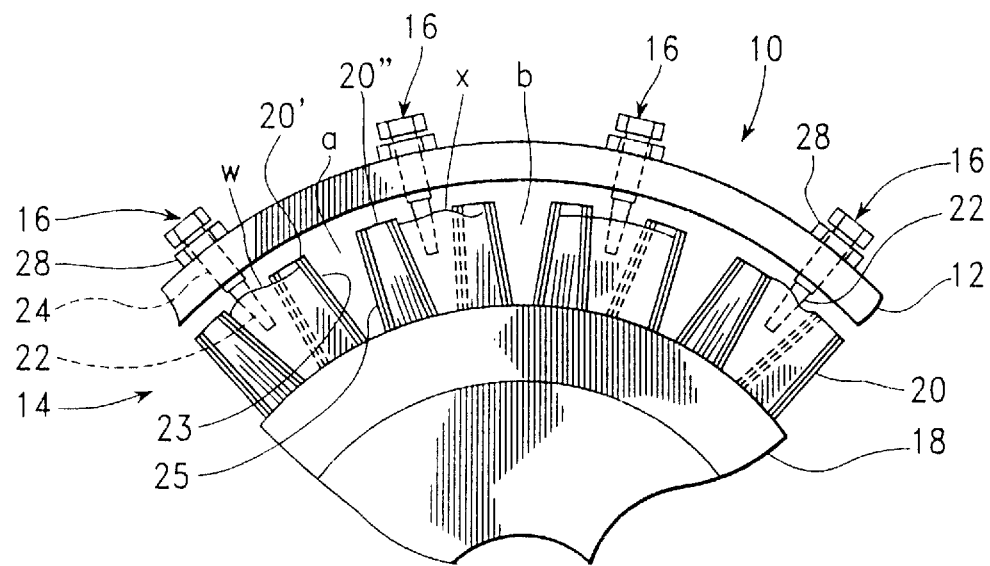
FIG. 5 is a partial view identical to FIGS. 3 and 4 with a new set of pins inserted in spaces previously worked, the previous pins removed and all the spaces re-cast and the cast medium and airfoil surfaces were cut by the machining operation.

In the next procedure as best seen in FIG. 5 the rigid ring 12 is located so that the bores __align with the alternate spaces that have been worked. The rigid ring 12 may either have all the bores formed therein, or in the alternative, it can be rotated one space to align the previously used bores with the next to be pinned spaces. In this example, the pins 16 are now disposed so that the tapered portion 22 extends into spaces w and x. The void spaces are re-cast leaving the spaces a and b pinless. (The cast medium in spaces a and b are not shown in FIG. 5 because this Fig. depicts the IBR and fixture after the machining operation). After the cast medium has solidified and bonded the pins to the IBR the unit is again returned to the machine center to cut the tailing edge 23 of blade 20' and the leading edge 25 of blade 20", noting that the cutting removes the cast medium in space a and the cutting is from the tip to the root of the blades.

Figure 6:
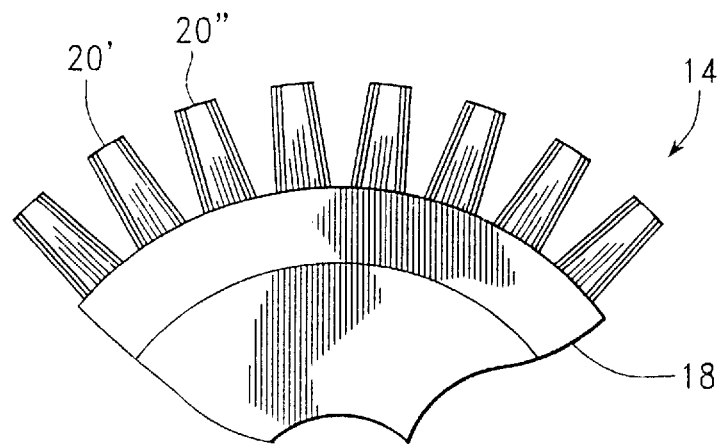
FIG. 6 is a partial view in elevation illustrating the final finished configuration of the IBR.

The fixture and IBR are then removed from the cutting machine and the cast medium is removed by heating the unit to the melting point of the cast medium resulting in the finished IBR as shown in FIG. 6.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. The method of machining the surfaces of the airfoils of an integral bladed rotor comprising the steps of:

providing a rigid ring dimensioned to surround the periphery of the integral bladed rotor;

providing tapered pins and attaching them to the rigid ring to project axially into alternate spaces between the adjacent blades of the integral bladed rotor;

casting the integral bladed rotor to fill the spaces between adjacent blades and embedding the tapered portion of the pins;

curing the cast integral bladed rotor until the cast medium solidifies and secures the fixture to the integral bladed rotor;

machining the pinless spaces to remove the cast medium and finish contour half of the surface of the blades;

removing the pins from the alternate spaces and the cast medium;

inserting the pins through the fixture into the remaining alternate spaces;

casting the integral bladed rotor to fill all the spaces between blades and embedding the tapered portion of the pins;

curing the cast integral bladed rotor until the cast medium solidifies and secures the fixture to the integral bladed rotor;

machining the pinless spaces to remove the cast medium and finish contour the remaining half of the surface of the blades; and removing the cast medium and fixture from the integral bladed rotor.

2. The method as claimed in claim 1 wherein the method of attaching includes the tightening of lock nuts to secure the pins in a predetermined radial position.

3. The method as claimed in claim 2 wherein the rigid ring is made from metallic material and forming spaced through bores around the circumference thereof.

4. The method as claimed in claim 3 wherein the cast medium is selected from a group consisting of plastics.

5. The method as claimed in claim 3 wherein the cast medium is selected from a group consisting of plasters.

* * * * *